No. 896,313. PATENTED AUG. 18, 1908.
C. A. MOORE.
REFRIGERATOR CAR.
APPLICATION FILED MAR. 30, 1907.
6 SHEETS—SHEET 2.
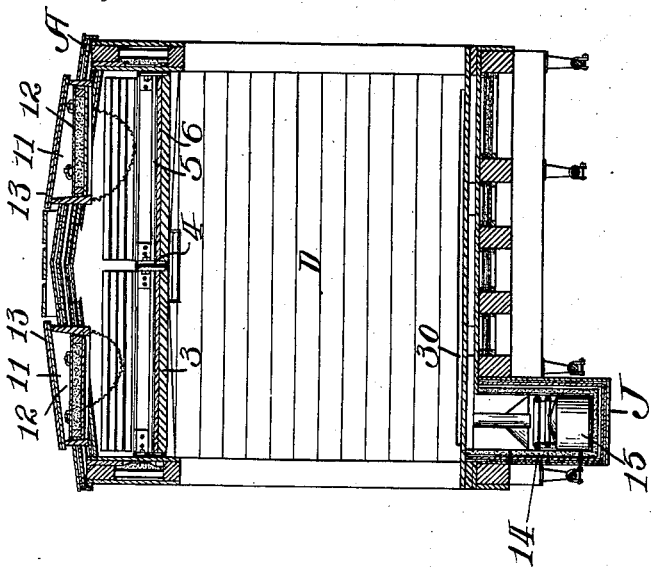
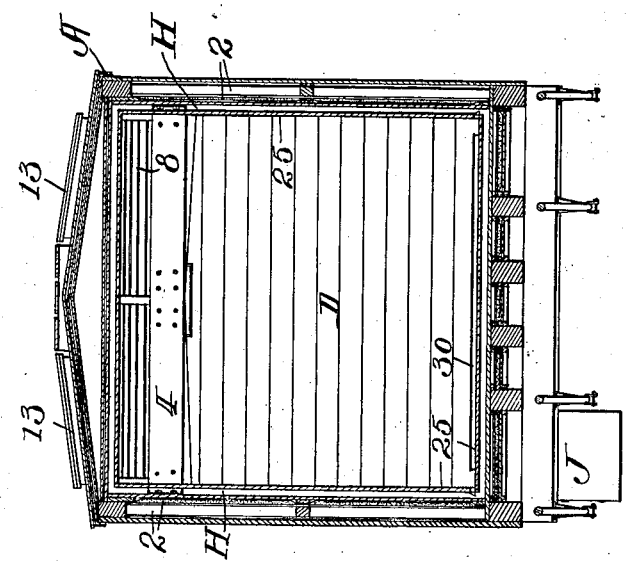
Witnesses:
N. L. Fischer.
W. H. Williams
Inventor:
Charles A. Moore,
by: F. G. Bradbury
Attorney.

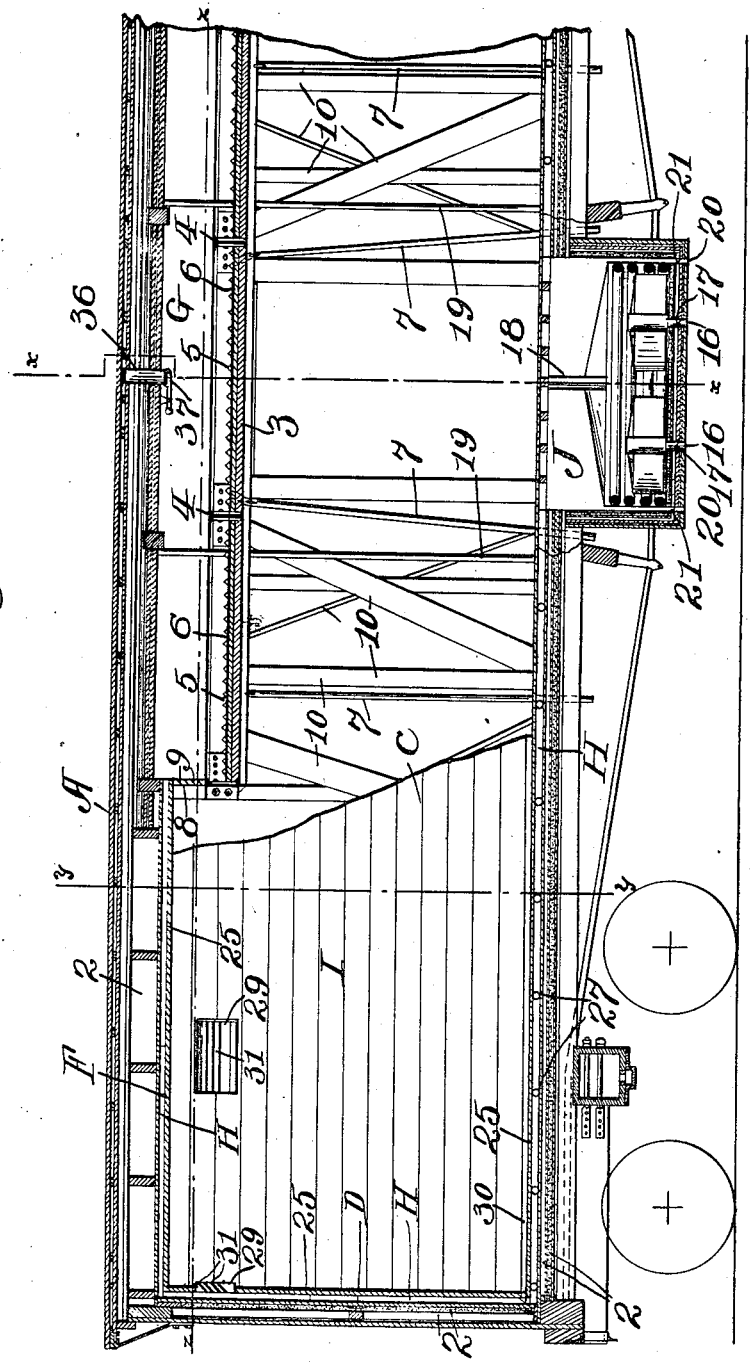

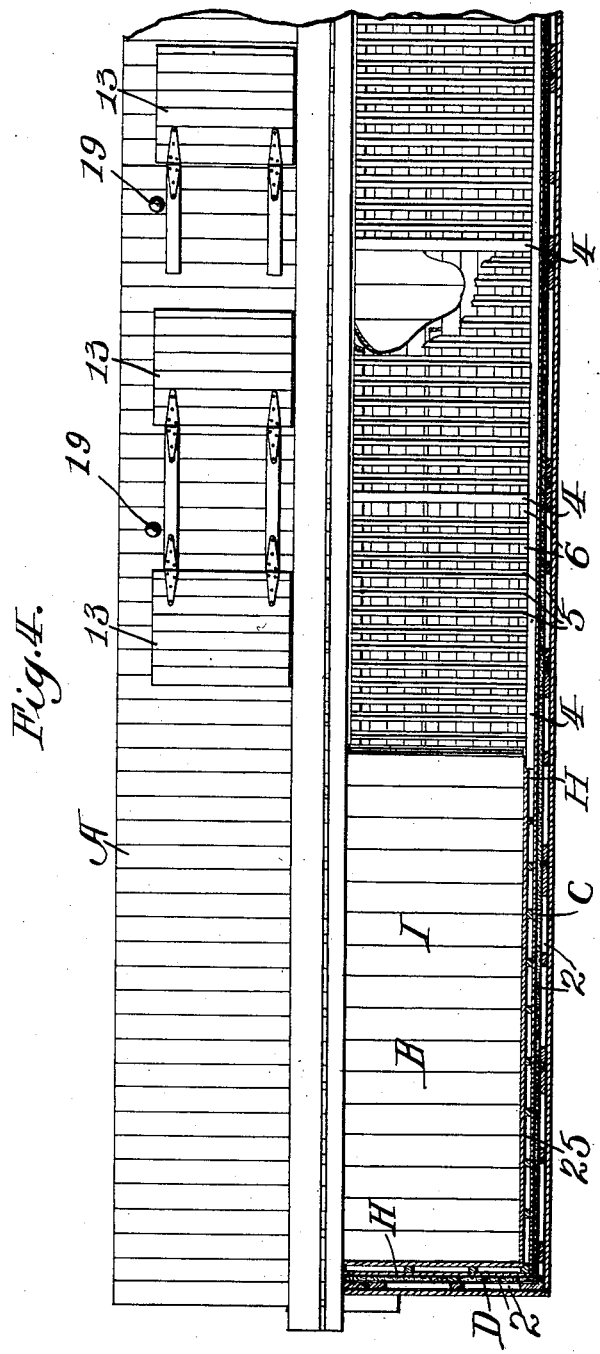

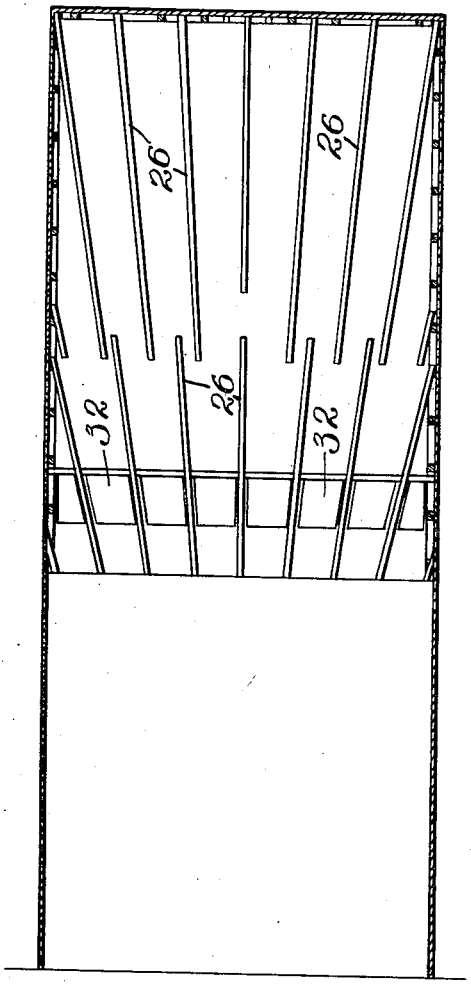

No. 896,313.
PATENTED AUG. 18, 1908.
C. A. MOORE.
REFRIGERATOR CAR.
APPLICATION FILED MAR. 30, 1907.
6 SHEETS—SHEET 5.
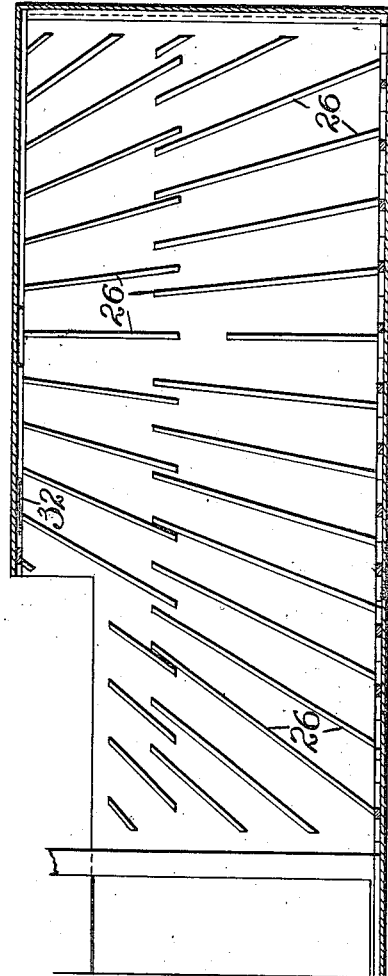
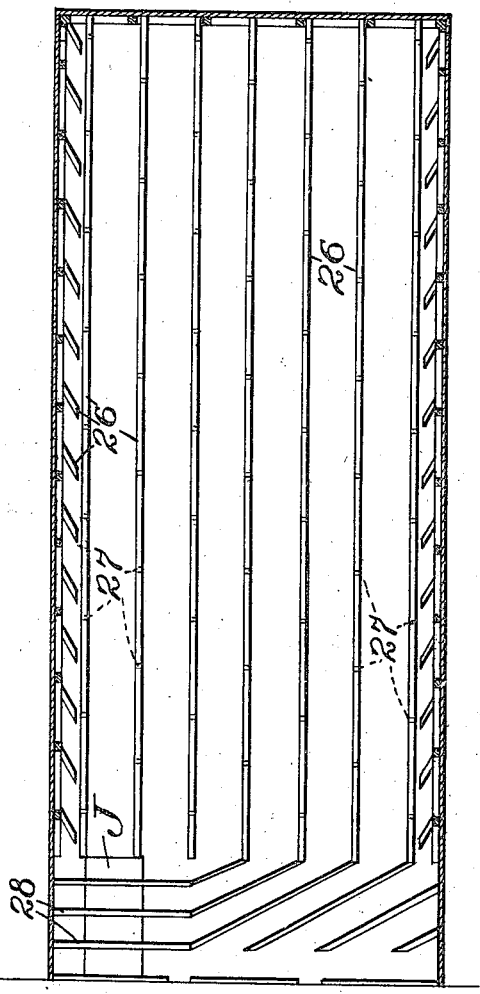
Witnesses:
D. H. L. Fischer.
W. H. Williams
Inventor:
Charles A. Moore,
by: F. G. Bradbury.
Attorney.

No. 896,313. PATENTED AUG. 18, 1908.
C. A. MOORE.
REFRIGERATOR CAR.
APPLICATION FILED MAR. 30, 1907.
6 SHEETS—SHEET 6.
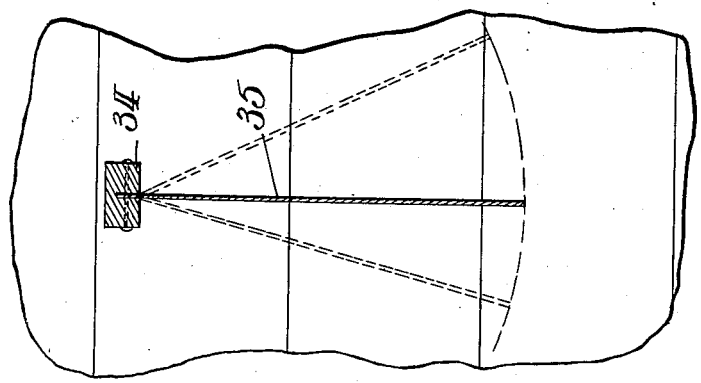
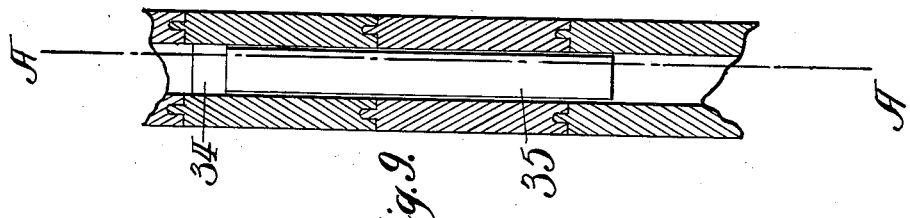
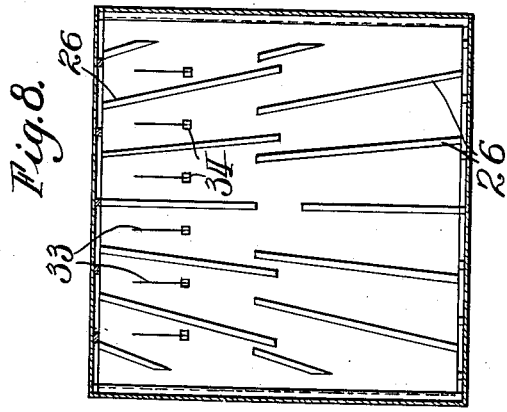
Witnesses:
H. L. Fischer
R. H. Williams
Inventor:
Charles A. Moore,
by: F. G. Bradbury
Attorney.

UNITED STATES PATENT OFFICE.

CHARLES A. MOORE, OF ST. PAUL, MINNESOTA, ASSIGNOR TO MOORE PATENT CAR CO., A CORPORATION OF MINNESOTA.

REFRIGERATOR-CAR.

No. 896,313.     Specification of Letters Patent.     Patented Aug. 18, 1908.

Application filed March 30, 1907. Serial No. 365,578.

*To all whom it may concern:*

Be it known that I, CHARLES A. MOORE, a citizen of the United States, residing at St. Paul, in the county of Ramsey and State of Minnesota, have invented a new and useful Improvement in Refrigerator-Cars, of which the following is a specification.

My invention relates to improvements in refrigerator cars which are cooled, heated and ventilated.

The primary object attained by this invention is the ventilation of that class of cars above referred to.

Further objects are the maintenance of a sufficiently low temperature within the car when the outside atmosphere is warm and of a temperature above freezing when the outside atmosphere is below, simplicity of construction, and effectiveness in use. Depending in part upon these requirements, I provide a combined ventilator, refrigerator and heater by means of which the air within the car is circulated and maintained at the proper temperature and humidity in the simplest and most direct and efficient manner to accomplish the objects sought.

My invention further consists of the features, details of construction, and combinations of parts hereinafter described and claimed.

In the accompanying drawings, forming part of this specification, Figure 1 is a central longitudinal section of part of a refrigerator car, a portion of the side shown being broken away to illustrate its reinforced construction; Fig. 2 is a cross sectional view of the car taken on the line X—X of Fig. 1; Fig. 3 is another cross sectional view taken on the line Y—Y of Fig. 1; Fig. 4 is a plan view of that portion of the car shown in Fig. 1, a portion of said car being taken in section on the line Z—Z of Fig. 1; Fig. 5 is a diagrammatic plan view in section of the roof of one-half of the car illustrating the arrangement of the air ducts in the walls of the car; Fig. 6 is a diagrammatic side view of one-half of the car illustrating the arrangement of the air ducts in the walls of the car; Fig. 7 is a diagrammatic plan view of the floor of one-half of the car illustrating the arrangement of the air ducts; Fig. 8 is a diagrammatic view in section of one end of the car illustrating the air ducts in the walls; Fig. 9 is an enlarged detail sectional view of one of the automatic fans used in the air ducts and Fig. 10 is a sectional view of Fig. 9 taken on the line A—A.

Speaking generally, the car A having floor B, sides C, ends D, and ceiling or roof F is provided with an ice bunker G and a heating chamber J. The walls, flooring, and roof of the car are made double, treble, or quadruple, with any desired number of dead air spaces 2 between the separate portions of the walls, which air spaces may, if desired, be filled with any suitable material which may serve to insulate the interior of the car. The ventilating passageway H surrounding the provision chamber I in the car however, is open and not filled with material of any kind and is connected with the ice bunker G and heating chamber J.

The ice bunker is located substantially midway between the ends of the car and extends horizontally along its roof and below the ceiling, it being understood that the drawings illustrate but a portion of the car and that the ends are of similar construction. The ice bunker consists of a flooring 3 which is supported upon intersecting I beams 4, the ends of the transverse beams thereof being set and supported in the side walls of the car. Angle irons 5 with their apexes directed upward and resting upon the strips 6 above the floor of the ice bunker serve to support the ice. The water dripping from the ice passes from the floor of the bunker down the drain pipes 7 extending through the sides and leading below the floor of the car. The ends of the ice bunker have openings 8 communicating with the upper portion of the car in the provision chamber I and are provided with horizontal slats 9 spaced apart. The frame of the car adjoining the ice bunker is reinforced by the braces 10 located in the sides. It is understood that the ends of the bunker are of similar construction, the drawings illustrating but one. In the roof of the car immediately above the ice bunker are hatchways 11 through which ice is placed in the ice bunker. These hatchways are closed by means of stoppers 12 and covers 13.

The heating chamber J is located substantially midway between the ends of the car and below the floor thereof. Its walls are suitably insulated in substantially the same manner as the refrigerator car. This heating chamber is provided with a hinged door 14 so that access can be had to the interior of the heating chamber for the purpose of operating the heating medium. In this heating chamber is placed a stove 15 which carries a supply of oil or any suitable fuel. Air is admitted to the heater through passageways 16 which are provided with hand-operated valves 17 for regulating the amount of air supplied to said refrigerator. The gases and products of combustion are carried from the heater by means of the pipe 18 which extends upward through the roof of the car by means of branches 19. Air is admitted into the heating chamber through inlets 20 which have hand-operated valves 21 and regulates the supply of fresh air passing up through the heating chamber into the ventilating passageway H surrounding the provision chamber I in the car. It is obvious that heat may be generated in the heating chamber by any suitable means desired, without departing from the principles which I have applied.

The ventilating passageway H surrounding the provision chamber I in the car is constructed by means of a lining 25 which is secured by parting strips 26 to the walls, flooring and ceiling of the car. These parting strips are disposed longitudinally in the path of the current of air issuing from the heater or ice bunker and generally speaking, traverse the roof of the car from the ice bunker towards its ends as illustrated in Fig. 5, thence downwardly through the side and end walls as illustrated in Figs. 6 and 8 and thence longitudinally in the floor of the car toward the heating chamber, the parting strips in said floor being perforated at 27 and the passageways formed by all of said strips interconnecting with each other as shown in the drawings. In the floor, substantially midway between the ends of the car, are transverse parting strips 28 which form passageways communicating with the top of the heating chamber and the ventilating passageway H surrounding the provision chamber I. The spaces formed by the parting strips in the roof and side and end walls expand away from the ice bunker and vice versa contract away from the heating chamber. The ventilating passageway H is connected with the provision chamber by means of the inlets 29 and 30 respectively in the sides and end walls and near the roof, and near the floor of the car. The inlets 29 have horizontal slats 31 which are spaced apart and incline upwardly into the car.

In the ventilating passageway H surrounding the provision chamber I and located in the spaces between the parting strips in the roof, floor and ends of the car are a plurality of fans 32 and 33 which increase the current of air entering the ice bunker from the provision and heating chambers. These fans consist of a spring vane 35 one end of which is anchored in a block 34 and its opposite end free to vibrate by the jolting and motion of the car when traveling. When the vanes of these fans are in horizontal position the upward jolting of the car causes them to vibrate and when in vertical position the side jolting causes the same action. The blocks 34 on which the fans are mounted are fastened in the spaces between the parting strips 26. An overhead ventilator 36 is located in the roof of the car immediately above the ice bunker, this ventilator being closed or opened by means of a valve 37. When the valves 21 and 37 are opened, fresh air is circulated through the car and any provisions such as fruit and other commodities in transit are kept fresh and prevented from deteriorating. To cool the car, the ice bunker is filled with ice. The warm air is injected into the top of the ice bunker by the ventilating passageway H surrounding the provision chamber I, and the cold air from the ice bunker descends into the car through the openings 8. When it is desired to raise the temperature of the car, the heater 15 is operated and the valves 21 opened. The air from the heating chamber passes up through the ventilating passageway H, into the car through the inlets 29 and 30 and when it is desired to increase and freshen this circulation, the valve 37 can be opened.

In accordance with the patent statutes, I have described the principle of operation of my invention, together with the apparatus which I now consider to represent the best embodiment thereof, but I desire to have it understood that the apparatus shown is only illustrative and that the invention can be carried out by other means and applied to uses other than those above set forth.

Having described my invention, what I claim as new and desire to protect by Letters Patent, is:—

1. A refrigerator car, comprising, in combination with a suitable car body, having a provision chamber, an ice bunker extending horizontally along the roof and between the ends of said body, a hatchway entering said bunker through said roof, a heating chamber below said car body, a ventilating passageway surrounding and entering said provision chamber and connected with said bunker and heating chamber, and a fan in said ventilating passageway adapted to circulate air therethrough; whereby air is circulated by said passageway either from said ice bunker or heating chamber into said provision chamber.

2. A refrigerator car, comprising, in combination, a suitable car body having a provision chamber, an ice bunker substantially midway between its ends, extending horizontally along the roof of said body, and provided with openings into said provision chamber, a hatchway entering said bunker through the roof of the car, a heating chamber below the floor of the car body, a ventilating passageway surrounding and entering the provision chamber, bunker and heating chamber; said ventilating passageway being formed by a lining and a plurality of parting strips between said lining and the walls of the car body; whereby air is circulated by said passageway either from said bunker or heating chamber into said provision chamber.

3. A refrigerator car, comprising, in combination with a suitable car body having a provision chamber, an ice bunker between the ends, extending along the roof of said body and provided with an opening into the provision chamber, a heating chamber below the floor of said body, a ventilating passageway surrounding and entering the provision chamber and connected with said bunker and heating chamber, means for circulating air through said ventilating passageway, and a valved air inlet into said heating chamber; whereby air is circulated by said passageway either from said bunker or heating chamber into said provision chamber.

4. A car of the class set forth, comprising, in combination with a suitable body having a provision chamber, a lining in said provision chamber, a plurality of parting strips separating said lining from the frame of said car and converging in direction, and forming a ventilating passageway surrounding said provision chamber, an opening into said provision chamber from said passageway, means in said passageway for propelling air therethrough, and an inlet for outside air into said passageway.

5. A car of the class set forth, comprising, in combination with a suitable body provided with a provision chamber, a ventilating passageway surrounding and entering said provision chamber and provided with an inlet for outside air and a plurality of fans in said passageway adapted by the swinging motion of the car to force air into said provision chamber, for the purposes specified.

6. A car of the class set forth, comprising, in combination with a suitable car body provided with a provision chamber, a ventilating passageway entering said provision chamber at different places, and fans in said passageway, adapted by the swinging motion of the car to circulate air therethrough and increase the circulation of air in the provision chamber.

7. A car of the class set forth, comprising, in combination with a suitable car body provided with a provision chamber, a ventilating passageway surrounding and penetrating said provision chamber at a plurality of places, and a plurality of fans, adapted by the swinging motion of the car to circulate air through said ventilating passageway and into the provision chamber, for the purposes specified.

8. A refrigerator car, comprising, in combination with a suitable car body having a provision chamber, an ice bunker between the ends, extending along the roof of said body and provided with an opening into the provision chamber, a heating chamber below the floor of said body, a ventilating passageway surrounding and entering the provision chamber and connected with said bunker and heating chamber, and means for circulating air through said passageway; whereby air is circulated by said passageway either from said ice bunker or heating chamber into said provision chamber.

9. A refrigerator car, comprising, in combination with a suitable car body having a provision chamber, an ice bunker between the ends of said body and provided with an opening into the provision chamber, a ventilating passageway surrounding and entering the provision chamber and connected with said bunker, and means for circulating air through said ventilating passageway; whereby air is circulated by said passageway either from said bunker or heating chamber into said provision chamber.

10. A car, comprising, in combination with a suitable car body having a provision chamber, a heating chamber below the floor of said body, a ventilating passageway surrounding and entering the provision chamber and connected with said heating chamber, and means for circulating air through said ventilating passageway; whereby air is circulated by said passageway into said provision chamber from said heating chamber.

11. A refrigerator car, comprising, in combination with a suitable car body having a provision chamber, an ice bunker between the ends of said body and provided with an opening into the provision chamber, a ventilating passageway entering said body and connected with said bunker, and a heating chamber below the floor of said body; whereby air is circulated by said passageway into said provision chamber from said heating chamber.

In testimony whereof, I have signed my name to this specification, in the presence of two subscribing witnesses.

CHARLES A. MOORE.

Witnesses:
   H. L. FISCHER,
   F. G. BRADBURY.